United States Patent [19]
Marrs

[11] 4,348,986
[45] Sep. 14, 1982

[54] FARROWING PENS

[76] Inventor: James H. Marrs, P.O. Box 508, Fort Mill, S.C. 29715

[21] Appl. No.: 240,905

[22] Filed: Mar. 5, 1981

[51] Int. Cl.³ .............................................. A01K 1/02
[52] U.S. Cl. ......................................... 119/20; 119/28
[58] Field of Search ........................ 119/15, 16, 20, 28

[56] References Cited

U.S. PATENT DOCUMENTS

| | | | |
|---|---|---|---|
| 1,309,071 | 7/1919 | Johnson | 119/16 |
| 1,737,211 | 11/1929 | Barker | 119/16 |
| 3,181,503 | 5/1965 | Tripp | 119/20 |
| 4,256,057 | 3/1981 | Herring | 119/28 |

FOREIGN PATENT DOCUMENTS 325325  2/1930  United Kingdom .................. 119/16

*Primary Examiner*—Hugh R. Chamblee
*Attorney, Agent, or Firm*—Clifton T. Hunt

[57] ABSTRACT

A pallet is provided for farrowing pens and structured to prevent the sow from crushing newborn piglets. The pallet comprises an enthickened central portion having a flat upper surface and laterally sloping side panels extending downwardly and outwardly from the upper longitudinal edges of the central portion. Heating means are provided along the lower longitudinal edge of each side panel and the heating means is insulated from direct contact with the pallets. The heat attracts the piglets away from the sow and the insulation maintains the enthickened central portion at the ambient temperature of the farrowing pen for the sow's comfort.

7 Claims, 9 Drawing Figures

FARROWING PENS

BACKGROUND OF THE INVENTION

In past years, it has been customary to provide breed sows with a small farrowing house in an open field. Some of these earlier farrowing houses included provisions for protecting the newborn piglets from being crushed by their mother. See U.S. Pat. No. 391,858 issued Oct. 30, 1888 to Randleman et al., and U.S. Pat. No. 436,902 issued Sept. 23, 1890 to Osborn. The sloping floors in the Randleman and Osborn Patents were intended to gravitate the newborn piglets away from their mother/sow and into a protected area where the sow could not reach them. The sloping floors were effective for this purpose but had the disadvantage of causing the sow to move downhill during her labor activity and sometimes resulted in the sow being positioned crosswise or otherwise at a difficult angle for delivery. The sloping floors of the prior art also made it nearly impossible to give obstetric assistance and made it very dangerous for the farmer to enter the small building with the excited and distrustful sow. The sloping floor of the prior art is also disadvantageous in that it is difficult for a sow to get to her feet on a sloping surface and in her thrashing around, she injures the newborn piglets. An additional objection to the prior art farrowing pens of Randlemen and Osborn is that they are made from wood, which have proven disadvantageous because bacteria find refuge in the pores of wood and multiply. The bacteria may be dormant for several years and break out anew.

More recently, it has been found that sows can more efficiently and economically be farrowed inside a building constructed for that purpose. These facilities require the application of increasingly refined principles of breeding, nutrition, physiology and environmental control so that the hogs can be developed to economically produce the maximum quality products. The primary object with swine management is the minimization of environmental factors which are adverse to the swine to provide maximum opportunity for survival and growth of the newborn piglets. Examples of the farrowing houses in use today may be found in U.S. Pat. No. 4,217,859 issued Aug. 19, 1980 to Herring; U.S. Pat. No. 3,584,603 issued June 15, 1971 to Rutherford; U.S. Pat. No. 3,148,663 issued Sept. 15, 1964 to Conover; U.S. Pat. No. 3,191,578 issued June 29, 1965 to Magruder; and U.S. Pat. No. 3,418,975 issued Dec. 31, 1968 to E. L. Smith. See also: U.S. Pat. No. 3,175,535 issued Mar. 30, 1965 to Rigterink and U.S. Pat. No. 3,905,334 issued Sept. 16, 1975 to Stevenson. The concrete pig pallet of Stevenson replaces the prior art wooden floor in the farrowing pens and is beneficial in helping to eliminate the bacteria which previously germinated in the wooden structures.

SUMMARY OF THE INVENTION

According to this invention, a plurality of farrowing pens are removably interconnected within a building designed for the farrowing of pigs. Any desired number of pens may be placed in the building, but for purposes of illustration, it will be assumed that the building houses thirty (30) pens arranged in two rows of fifteen (15) pens each.

The invention is particularly concerned with the structure of the floor or pallet in each pen. The floor, or pallet, is formed of concrete and each one is a separate unit which can be moved into and taken out of position without disturbing the adjacent pallets. Each pallet includes a flat center section extending longitudinally of the pallet and having a slotted area at one end. Sloping side portions extend laterally from the flat center portion. The amount of the slope is not critical but is preferably in the range of a 5% to 10% slope. The sloped portions extend the length of the flat center portion.

A heated platform, also the length of the flat center portion, is supported along one longitudinal edge by the lower edge of one sloping side portion and along the other longitudinal edge by the lower edge of a sloping side portion of the adjacent pen. A partition fence extends longitudinally along the center line of the heated platform to divide one pen from the adjacent pen. The partition fence extending along the center line of the heating platform may be a part of a steel farrowing crate, such as shown in U.S. Pat. No. 3,905,334 to Stevenson. The heated platform can be heated by electricity or by conducting a heated liquid or steam through conduits embedded in the platform and may be thermostatically controlled.

The farrowing pens of this invention are intended to be used over the open pit waste disposal systems such as described, for example, in U.S. Pat. No. 3,175,535 to Rigterink. The slotted portion on the flat central portion of the present pallet extends behind the sow for waste disposal, as in U.S. Pat. No. 4,217,859 to Herring and in the Stevenson U.S. Pat. No. 3,905,334.

To applicant's knowledge, nobody has heretofore provided a farrowing pen having a flat center portion to accommodate a farrowing sow with sloping side panels extending laterally from the opposite sides of the center portion to receive the newborn piglets and a heated platform spaced laterally from the elevated flat central portion to attract the newborn piglets and keep them warm. A newborn piglet is dependent on supplemental heat because it is incapable of maintaining its own body temperature. On the other hand, sows must be protected from exposure to high temperatures because they have very limited capacity to dissipate body heat. It is generally desirable to maintain a temperature of 26.67° C. (80° F.) for newborn piglets, but this high temperature stresses the sow and causes milk fever, weight loss and reduction of milk production. 18.33° C. (65° F.) is generally considered a desirable temperature for sows.

The heated platform is a separate structure and is preferably thermally insulated from the concrete pallets which support it, so that the heating of the platform to a temperature satisfactory for the newborn piglets does not affect the temperature of the pallet under the sows.

It is an object of the present invention to provide a pallet for a farrowing pen which includes a central flat portion to accommodate a sow, laterally extending sloped portions to receive the newborn piglets and a heated platform supported near the lower edge of each sloping side to attract and warm the newborn piglets.

It is also an object of this invention to provide a farrowing pen, including a pallet wherein a central portion extending along a given plane is provided for the sow and sloping side panels diverge from opposite sides of the central portion to receive the newborn piglets and heated means are provided at the lower edges of the sloping side panels to attract and warm and piglets.

It is another object of the invention to provide a farrowing pen including a pallet wherein vertically spaced means are provided for isolating the sow from the newborn piglets and heating means are spaced from the isolating means to attract the piglets.

It is another object of the invention to provide a pallet of the type described which cooperates with a steel rod crate enclosure to house a sow in the center of the pallet and wherein side pens extend laterally from the crate above the pallet to contain the piglets.

It is another object of the invention to provide a pallet of the type described which cooperates with a steel rod crate enclosure to house a sow in the center of the pallet and wherein side pens extend laterally from the crate above the pallet to contain the piglets.

It is another object of this invention to provide a pallet with its crate and side pens arranged in cantilever fashion above a sludge pit and wherein the pallet includes a grating under the rear of the sow to dispose of waste.

A further object of the invention is to provide a pallet of the type described and wherein a heating panel is supported by adjoining pallets and insulated therefrom.

BRIEF DESCRIPTION OF THE DRAWINGS

FIG. 3A is an enlarged fragmentary perspective view with parts broken away illustrating the thermally insulated support of the heating panel by adjoining pallets;

Figure 1:
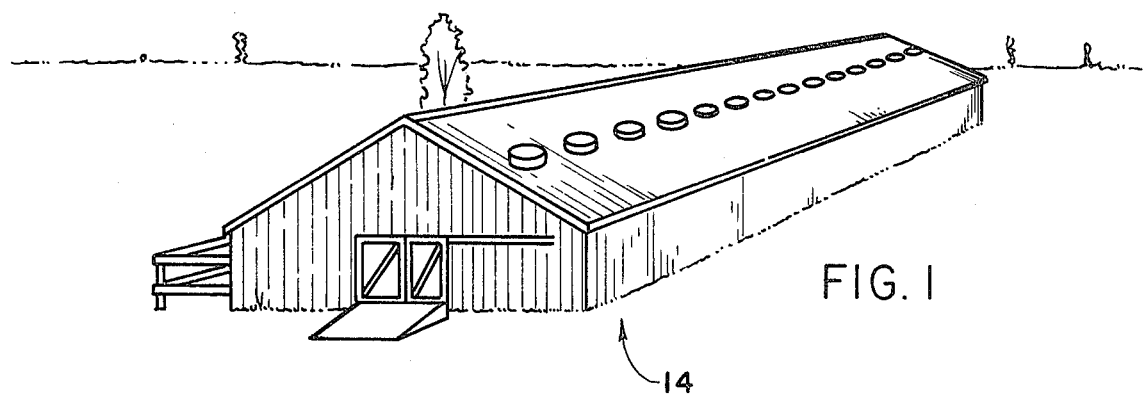
FIG. 1 is an environmental view of a farrowing building within which the farrowing pens of the invention are arranged in two longitudinal rows with a center walkway between them.
Figure 2:
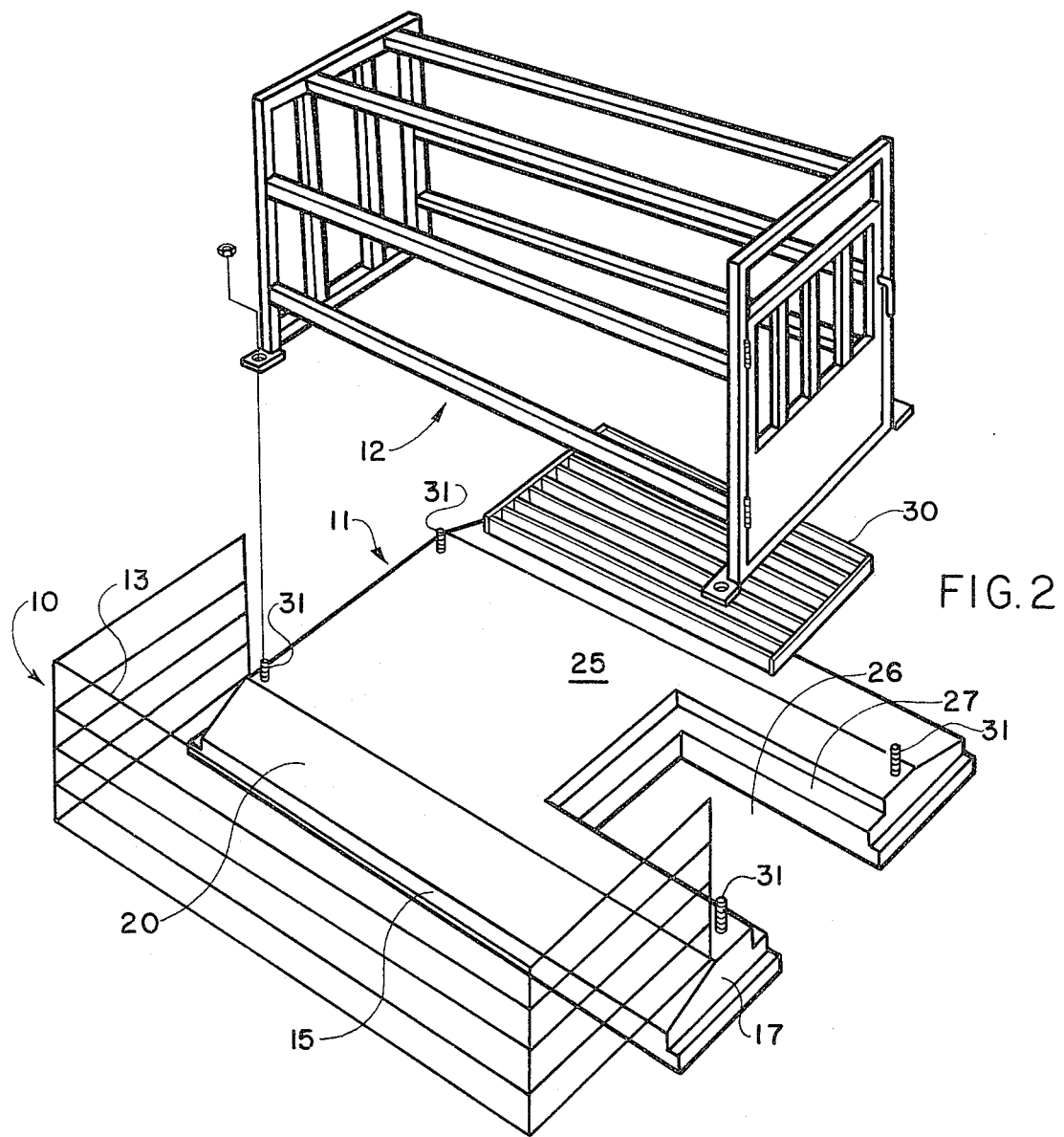
FIG. 2 is an exploded perspective view illustrating the association of the components of a farrowing pen within the building of FIG. 1.

Referring more specifically to the drawings, the numeral 10 broadly indicates a farrowing pen comprising a pallet broadly indicated at 11, a farrowing crate broadly indicated at 12 and a partition or perimeter fence 13. A plurality of such farrowing pens are arranged in longitudinal rows within a farrowing building which may be of any desired construction, an example being illustrated at 14 in FIG. 1.

Each pallet 11 is formed from reinforced concrete and is of rectangular configuration, including side walls 15 and 16 and end walls 17 and 18. Sloping side panels 20 and 21 rise upwardly and inwardly from the upper edges 22 and 23 of sloping side panels 20 and 21 define the longitudinal marginal edges of an enthickened central portion 24 having a flat upper surface 25. The enthickened central portion 24 is of U-shaped configuration having an opening 26 extending vertically therethrough and communicating with the end wall 17. A recessed shoulder 27 defines the opening 26 and serves as a seat for a steel grate 30, the upper surface of which is in the same plane as the upper surface 25 of the enthickened central portion 24 when assembled.

The pallet 11 is formed with upright bolts 31 projecting upwardly from the four corners of the upper surface 25 of enthickened central portion 24. The bolts 31 serve to removably secure the farrowing crate 12 to the pallet 11. The crate 12 is preferably of tubular steel construction but its exact details do not form a part of this invention and the crate may be of any desired construction such as illustrated, for example, at 14 in U.S. Pat. No. 3,905,334 to Stevenson.

Figure 3:
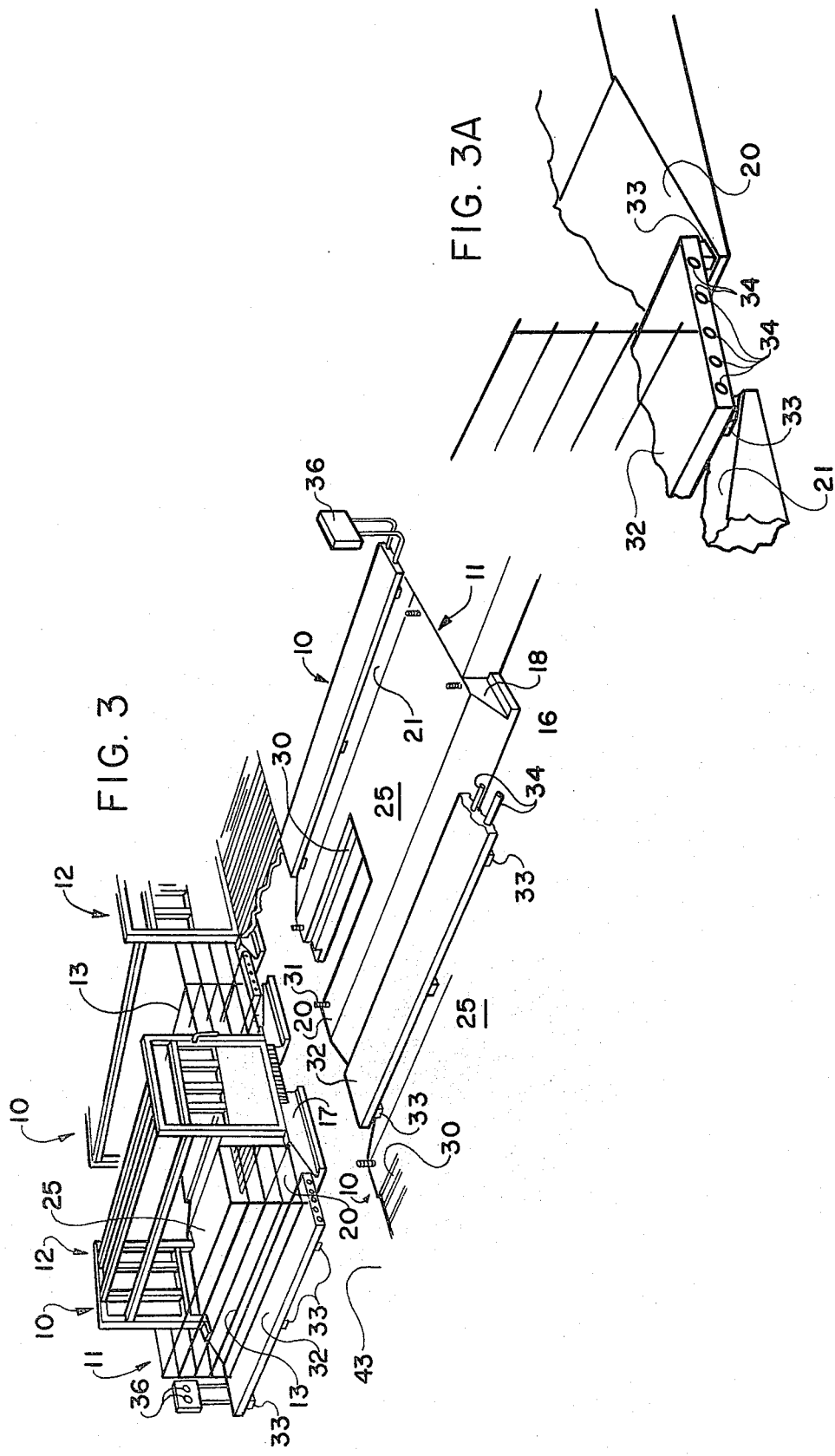
FIG. 3 is a fragmentary perspective view with parts broken away illustrating the arrangement of adjoining farrowing pens.

A heating pad 32 is supported on the lower longitudinal edge of the sloped side panels 20 and 21 of adjacent pallets 11 (FIG. 3a). Wooden blocks 33 are positioned between the lower longitudinal edges of proximal sloping side panels 20, 21 and support the heating pad 32 in spaced relation above the panels 20, 21. The heating pad 32 is formed of concrete and has embedded therein heating means 34 which may be electrical resistance heaters or tubular conduits for the passage of hot air, hot water or steam. The spacing of the heating pad 32 above the sloping side panels 20, 21 by the wooden blocks 33 serves to insulate the pallet 11 from the heat in pad 32, thereby enabling the pallet 11 to maintain the ambient temperature which may be kept at a desired rate such as 18.33° C. (65° F.) for the benefit of the sow within the building 14. The heating pads 32 are thermostatically controlled by individual thermostats 36 provided by each heating pad 32 within the building 14. This makes it possible for different temperatures to be provided according to the needs of different litters of piglets.

The perimeter fence 13 extends down the longitudinal axis of each heating pad 32 so that each heating pad 32 serves to provide heat to two litters of piglets, one on each side of the perimeter fence 13. The fence 13 otherwise extends about the farrowing crate 12 in a conventional manner such as shown, for example, in U.S. Pat. No. 4,217,859 to Herring and in U.S. Pat. No. 3,905,334 to Stevenson.

The pallet 11 of each farrowing pen 10, including the enthickened portion 24 and the sloping side panels 20, 21 is a separate entity and a pallet 11 may be individually removed and replaced within the building 14 without disturbing the other pallets 11. The replacement of the pallets sometimes becomes necessary because of the weight and action of a sow's hooves on the upper surface 25 causing it to become chipped and unusable.

Longitudinally extending flanges 40 and 41 extend from opposite ends of the pallets 11, the flanges 40 being on the opposed distal ends of the pallets 11, 11' opposite each other within the building 14 and serving to support one longitudinal edge of a walkway extending along the row of pallets 11. The flanges 41 extend toward each other from respective pallets 11, 11' spaced opposite each other within the building 14 and the flanges 41 on adjacent pallets 11 and opposed pallets 11' support a slotted or grate-like walkway 42 above a sludge pit 43 extending the full length of the rows of pallets 11 and 11' within building 14. The sludge pit 43 is of sufficient width to extend the length of the grates 30 in opposed pallets 11 and 11'.

Figure 4:
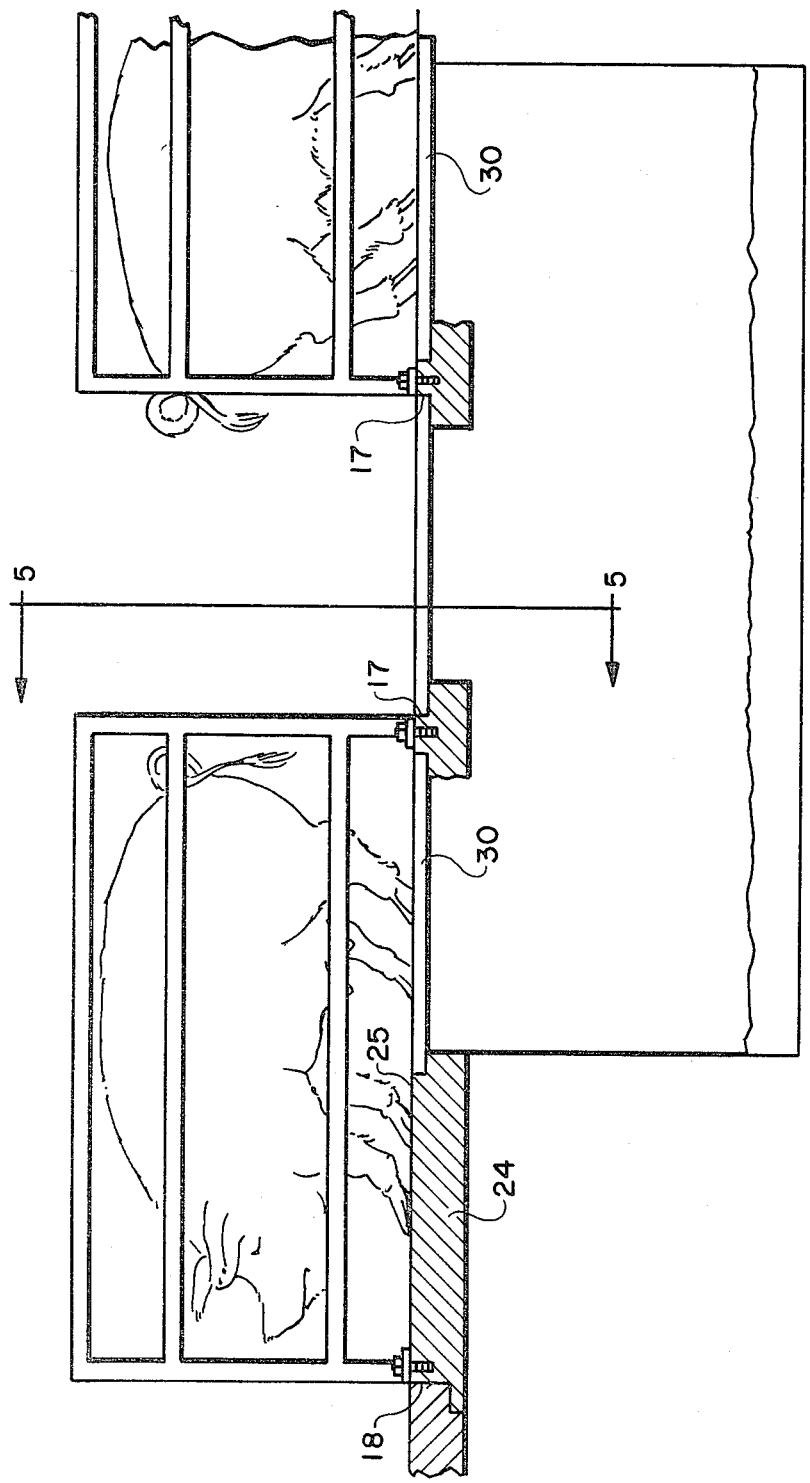
FIG. 4 is a sectional view through the sludge pit and illustrating the arrangement of opposed farrowing pens relative to the sludge pit.
Figure 5:
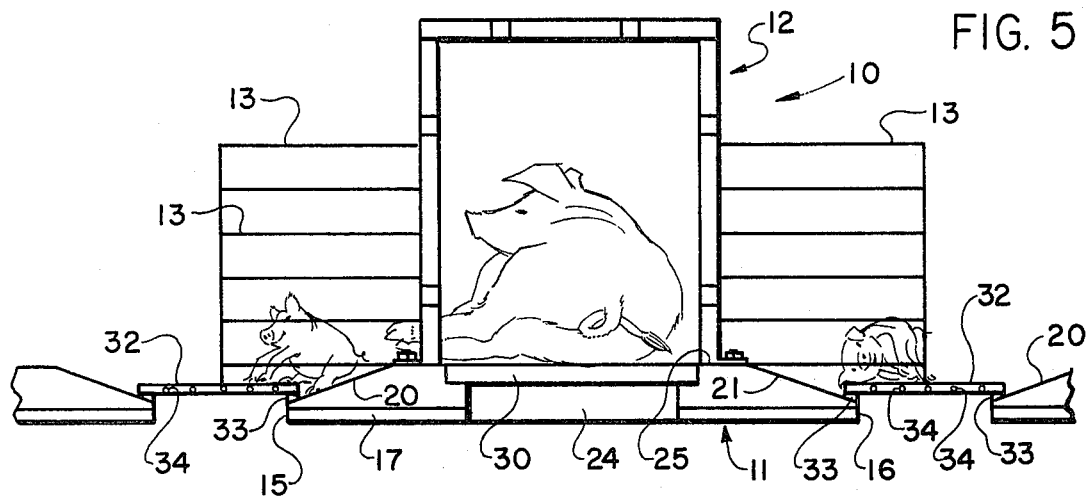
FIG. 5 is a sectional view shown in elevation and taken substantially along the line 5—5 in FIG. 4.
Figure 6:
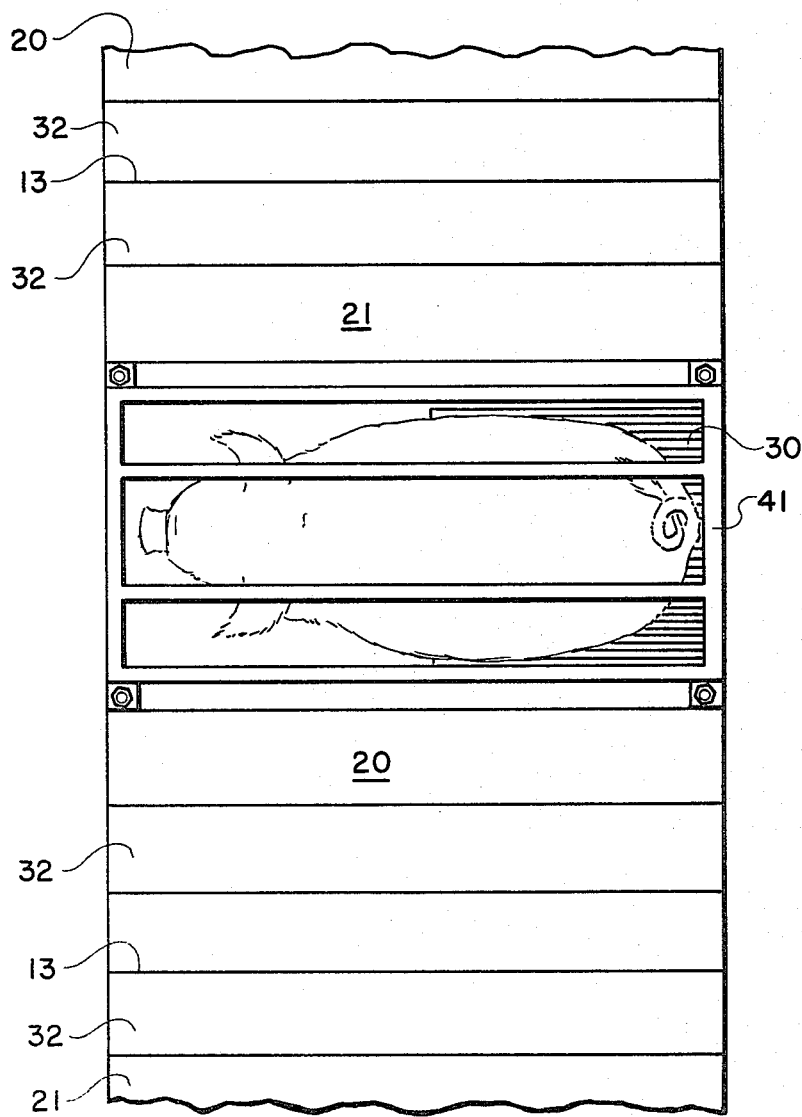
FIG. 6 is a top plan view of one of the pens and with the adjoining pens being cut away.
Figure 7:
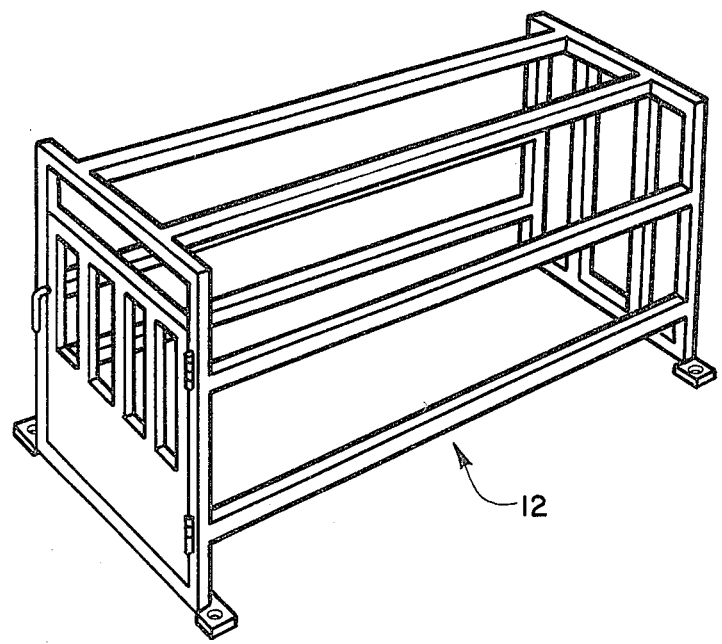
FIG. 7 is a perspective view of the farrowing crate removed from the pen.
Figure 8:
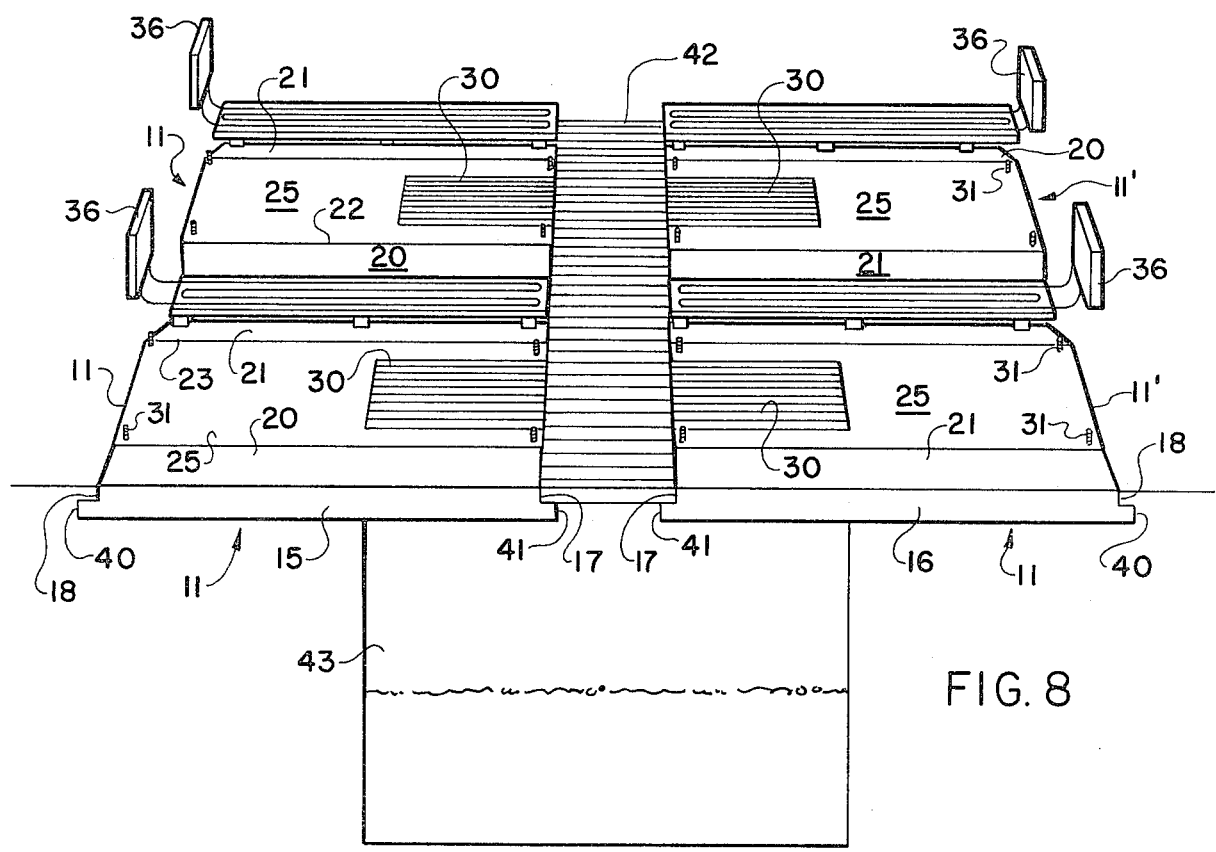
FIG. 8 is a perspective view illustrating the arrangement of opposed pallets relative to each other and to the sludge pit with the farrowing crates and pens removed for purposes of clarity.

In operation, a sow is placed on a pallet 11 within a crate 12 with her head facing away from the grate 30 as in FIGS. 4, 5 and 6. As the piglets are born, they have a tendency to move down the inclined side panels 20 and 21. The warmth of the heating pad 32 attracts the piglets and they tend to stay close to the heating pad 32 except when they are hungry and need to nurse. The slope of the side panels 20 and 21 is slight enough that the piglets are enabled to climb it and reach their mother when desired. After nursing, they again tend to move down the side panels 20 and 21 toward the heating pads 32 where they remain out of danger of being crushed by the sow's movements.

The crate 12 effectively confines the sow to the enthickened central portion 24 whether the sow be standing or lying down. As illustrated in FIG. 5, the feet of a sow lying down extend over the sloping side panels 20 or 21, but the difference in elevation is such as to prevent any piglets from being crushed by the sow's weight.

The spacing of the heating pads 32 above the side panels 20 and 21 provides an effective passageway for waste from the piglets between the side panels 20 and 21 and the elevated heating pad 32. The waste flows into the sludge pit 43.

There is thus provided a concentration of farrowing pens within a single enclosure or building which simplifies the care of the sows and piglets and wherein each of the pens includes a pallet with a primary location for the sow elevated above the primary location for the piglets to reduce the likelihood of the piglets being crushed or injured by their mother's movement.

I claim:

1. In an animal shelter for newborn pigs wherein there is provided a plurality of farrowing pens arranged in opposing rows, each farrowing pen having a crate for confining a sow therein and a perimeter fence spaced from opposite sides of the crate and joined thereto for confining a newborn litter of pigs and wherein there is further provided a center aisle disposed between said opposing rows for access to the farrowing pens, the combination therewith of
   (a) a pallet in each farrowing pen and each said pallet including an central portion having a flat upper surface and a pair of side panels sloping downwardly and away from the central portion;
   (b) a heating pad extending along the lower longitudinal edge of each sloping side panel; and
   (c) insulating means supporting the heating pad out of direct contact with the pallets.

2. In a farrowing pen having a perimeter fence to confine piglets and a farrowing crate within the perimeter fence to confine a mother sow while allowing the piglets free access to and from the sow through the crate, a pallet including a central portion with a flat upper surface conforming to the shape and dimensions of the farrowing crate and extending therebeneath, means connecting the crate to the pallet, and a pair of side panels sloping downwardly and away from the central portion and beyond the juncture of the crate and the pallet and toward the perimeter fence, whereby the piglets move down the sloping side panels to avoid being injured by the sow and move up the side panels to nurse the sow.

3. A structure according to claim 2 wherein the sloping side panels have lower edges and wherein heating means are provided only along the lower edges of the sloping side panels.

4. A structure according to claim 3 wherein means are provided for thermally insulating the heating means from the pallet.

5. A method of protecting newborn piglets which comprises the steps of confining the mother sow at a first elevation, providing heating means at a second elevation beneath said first elevation and spaced laterally from the confined sow to attract the piglets and warm them, and providing sloping means extending between said first elevation and the second elevation to provide free access for the piglets between the two elevations.

6. A method according to claim 5 which includes the step of thermally insulating the heating means from the confined sow.

7. In a farrowing pen having a farrowing crate to confine a mother sow and a perimeter fence spaced from the crate to confine the baby piglets, a pallet including a central portion with a flat upper surface and a pair of side panels each sloping downwardly and away from the central portion providing an area to contain said piglets and each including a lower longitudinal edge, a heating pad extending along the lower longitudinal edge of each sloping side panel, and insulating means supporting the heating pad out of direct contact with the pallet.

* * * * *